United States Patent
Ermacora et al.

(10) Patent No.: US 6,427,428 B1
(45) Date of Patent: Aug. 6, 2002

(54) CUTTING DEVICE FOR A CUTTING MACHINE

(75) Inventors: Rino Ermacora, St Jean Saverne; Bernard Wattron, Haegen; Martin Walch, Dettwiller, all of (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 09/522,306

(22) Filed: Mar. 9, 2000

(30) Foreign Application Priority Data

Mar. 24, 1999 (FR) .......................... 99 03775

(51) Int. Cl.[7] .............................. A01D 34/66
(52) U.S. Cl. ................... 56/6; 56/13.6; 56/192
(58) Field of Search ................ 56/6, 13.6, 16.4 R, 56/157, 192, 255, 295, DIG. 20, DIG. 17

(56) References Cited

U.S. PATENT DOCUMENTS

| | | | |
|---|---|---|---|
| 2,625,784 A | | 1/1953 | Kelsey |
| 4,292,790 A | * | 10/1981 | Mathews .................... 56/13.6 |
| 4,314,436 A | * | 2/1982 | van der Lely ............... 56/13.6 |
| 4,610,128 A | | 9/1986 | Ermacora |
| 4,669,256 A | | 6/1987 | Ermacora et al. |
| 4,694,640 A | | 9/1987 | Ermacora et al. |
| 4,714,123 A | | 12/1987 | Ermacora et al. |
| 4,719,742 A | | 1/1988 | Ermacora et al. |
| 4,720,963 A | | 1/1988 | Ermacora et al. |
| 4,723,396 A | | 2/1988 | Ermacora |
| 4,763,463 A | | 8/1988 | Ermacora et al. |
| 4,771,591 A | | 9/1988 | Ermacora |
| 4,787,196 A | * | 11/1988 | Voler et al. ................... 56/13.6 |
| 4,809,488 A | * | 3/1989 | Neuerburg et al. .......... 56/13.6 |
| 4,811,553 A | | 3/1989 | Ermacora et al. |
| 4,833,868 A | | 5/1989 | Ermacora et al. |
| 4,848,069 A | | 7/1989 | Ermacora et al. |
| 4,947,629 A | | 8/1990 | Ermacora et al. |
| 4,986,064 A | | 1/1991 | Ermacora |
| 4,991,383 A | | 2/1991 | Ermacora |
| 5,060,462 A | | 10/1991 | Helfer et al. |
| 5,094,063 A | | 3/1992 | Wattron et al. |
| 5,107,663 A | | 4/1992 | Wattron et al. |
| 5,136,828 A | | 8/1992 | Ermacora |
| 5,199,249 A | | 4/1993 | Wattron et al. |
| 5,199,250 A | | 4/1993 | Ermacora et al. |
| 5,357,737 A | | 10/1994 | Ermacora et al. |
| 5,417,042 A | | 5/1995 | Walch et al. |
| 5,423,165 A | | 6/1995 | Walch et al. |
| 5,507,136 A | | 4/1996 | Walch |
| 5,522,208 A | | 6/1996 | Wattron |
| 5,660,032 A | | 8/1997 | Neuerburg et al. |
| 5,749,390 A | | 5/1998 | Ermacora et al. |
| 5,794,424 A | | 8/1998 | Ermacora et al. |
| 5,852,921 A | | 12/1998 | Neuerburg et al. |
| 5,857,314 A | | 1/1999 | Wolff |
| 5,901,533 A | | 5/1999 | Ermacora et al. |
| 5,901,537 A | | 5/1999 | Walch et al. |
| 5,966,913 A | | 10/1999 | Neuerburg |
| 5,992,133 A | | 11/1999 | Walch et al. |
| 6,003,291 A | | 12/1999 | Ermacora et al. |

FOREIGN PATENT DOCUMENTS

| | | |
|---|---|---|
| DE | 28 16 144 | 10/1979 |
| EP | 0 245 186 | 11/1987 |
| FR | 1440389 | 9/1967 |
| FR | 2759533 | 8/1998 |
| GB | 2 089 634 | 6/1982 |

\* cited by examiner

*Primary Examiner*—Thomas B. Will
*Assistant Examiner*—Meredith C. Petravick
(74) *Attorney, Agent, or Firm*—Oblon, Spivak, McClelland, Maier & Neustadt, P.C.

(57) ABSTRACT

A cutting device for a cutting machine including a driver driven by a drive shaft, a support structure secured to the driver and at least one drive device intended to drive a cut product toward the rear of the cutting machine. The drive device includes at least two drive walls which extend approximately right around the support structure and which are fixed removably to the support structure by assembly elements.

20 Claims, 5 Drawing Sheets

CUTTING DEVICE FOR A CUTTING MACHINE

BACKGROUND OF THE INVENTION

1. Field of the Invention

The present invention relates to a cutting device for a cutting machine including
 a driver intended to be driven by a drive shaft,
 at least one cutting support supporting at least one cutting element,
 a support structure secured to the driver,
 at least one drive device intended to drive the cut product toward the rear of the cutting machine.

2. Discussion of the Background

A cutting device of this kind fitted to a cutting machine is known from the state of the art.

This cutting machine includes a cutting mechanism comprising a number of cutting devices arranged in a line extending transversely to the direction of forward travel during work.

Each cutting device includes, broadly speaking, a drive shaft intended to be driven in rotation about an axis of revolution extending upward, a driver which is fixed to said drive shaft and a support structure which is welded to the driver. Welded to the support structure is a drive device which is intended to drive a cut product toward the rear of the cutting machine when the drive shaft is driven in rotation. Fixed to the drive device are two cutting supports each one supporting a cutting element intended to cut a standing product which is intended to be driven backward by means of said drive device. The assembly comprising driver, support structure and drive device, forms a set of elements which are fixed to the drive shaft by means of said driver which is located between two rolling-bearing fittings, which makes this assembly difficult and arduous to remove. Removal of this assembly is needed when, in particular, the drive device which is in contact with the cut product and which therefore experiences wear or damage through being struck by stones, for example, needs to be replaced.

Another drawback lies in the fact that the driver, the support structure and the drive device form a single assembly, which means that the various elements of this assembly have to be of a fairly significant mass so that they can withstand the stresses to which said elements, particularly the drive device, are subjected, which results in a relatively high cost. Furthermore, when, for example, only the drive device is damaged, the driver and the support structure have also to be replaced given that these three elements are welded together.

SUMMARY OF THE INVENTION

The purpose of the present invention is to overcome the aforementioned drawbacks so as to allow easy and quick removal, particularly of the drive device, while at the same time seeking to obtain a simple and inexpensive solution.

To this end, the cutting device is one wherein the drive device includes at least two drive walls which extend approximately right around the support structure and which are fixed removably to said support structure by means of assembly elements.

The invention also relates to the following features considered in isolation or in any technically feasible combination:

the support structure is fixed removably at one of its ends to the driver by means of assembly elements;

the cutting device includes an upper support intended to be connected to a member of the cutting machine and to which the support structure is connected removably by means of assembly elements;

the upper support includes a first part intended to be connected to said member of the cutting machine and a second part connected to said first part by means of a connection of the pivot type, the support structure being connected removably to said second part of said upper support by means of said assembly elements;

the first part of the upper support is intended to be connected directly or indirectly to said member of the cutting machine by means of an elastic connection which advantageously makes it possible to filter all or some of the vibrations between said member of said cutting machine and said first part of said upper support;

the drive walls extend approximately vertically between the upper support and the cutting support(s);

the drive walls bear against the support structure and each forms, when viewed from above, at least approximately a portion of a surface of revolution;

each drive wall includes two lateral ends extending upward and said drive walls overlap at their lateral ends;

the drive walls are at least approximately identical which advantageously allows their manufacture to be simplified and their cost of manufacture thus restricted;

the drive device additionally includes at least two drive members fixed to the support structure by means of assembly elements;

the number of drive members is identical to the number of drive walls, and each of said drive members extends upward in the region of the corresponding lateral ends of the drive walls;

the drive members bear against the corresponding drive walls and allow said drive walls to be fixed to the support structure by means of the corresponding assembly elements;

each drive wall includes a groove in which part of the corresponding drive member is housed, which advantageously makes it possible to avoid product cut by the cutting elements building up between said drive wall and said drive member;

the cutting device includes a casing by means of which it is intended to be fixed to a drive mechanism by means of assembly elements;

the driver has at least one access orifice, intended to allow access to the assembly elements intended for fixing the casing to the drive mechanism;

the (each) cutting support is fixed to the driver removably by means of assembly elements;

the cutting device includes two cutting supports located radially facing each other;

the assembly elements are made up of screws or bolts.

The invention also relates to a cutting machine including a drive mechanism and at least one cutting device, said cutting device including one or more of the features hereinabove.

BRIEF DESCRIPTION OF THE DRAWINGS

Other objects, features and advantages of the invention will become clear from the following description with reference to the appended drawings, which by way of nonlimiting examples, depict a number of embodiments of the cutting device.

In these drawings.

DESCRIPTION OF THE PREFERRED EMBODIMENTS

Figure 1:
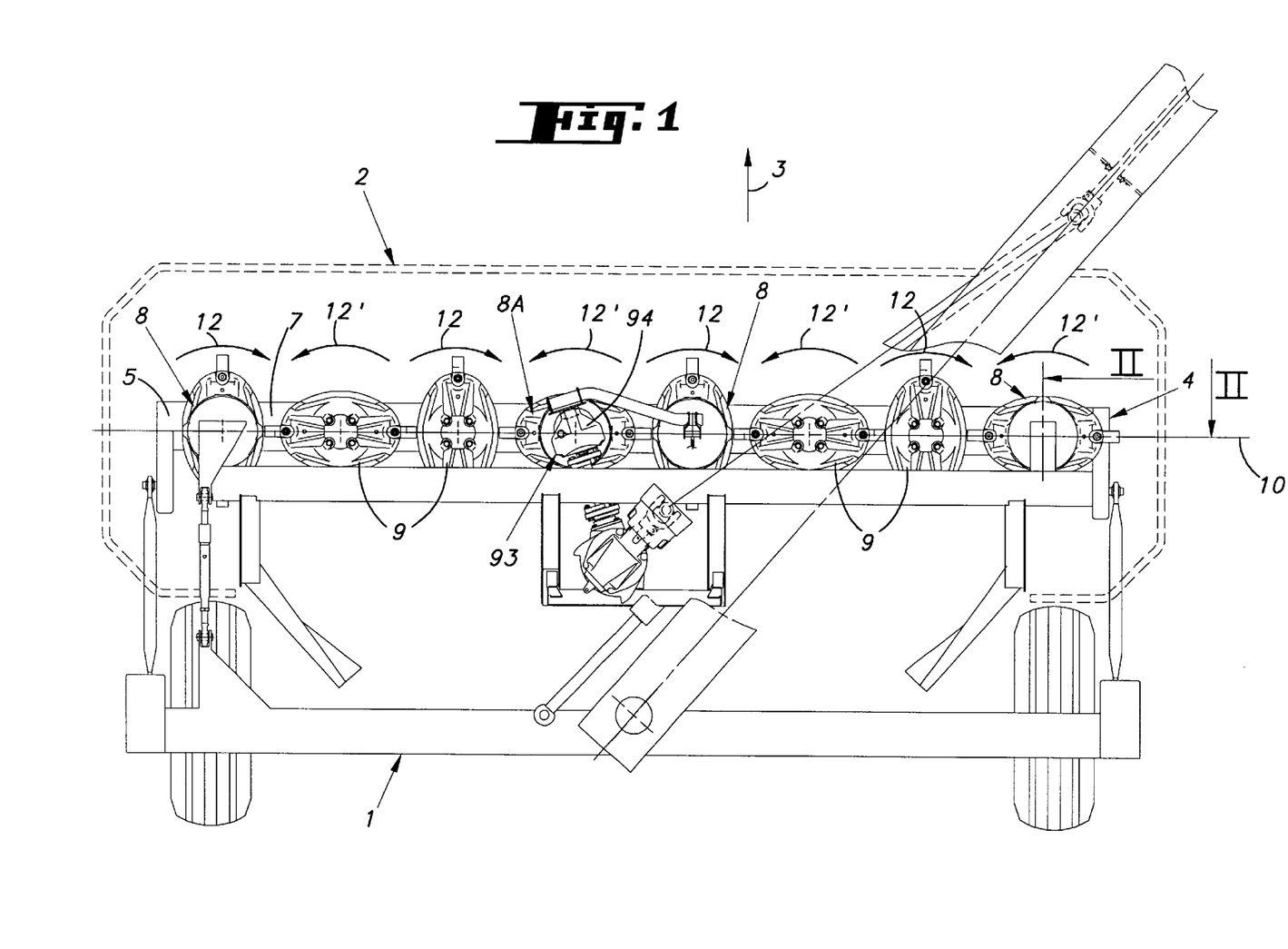
FIG. 1 depicts a top view of a cutting machine equipped with cutting devices according to the invention and on which a number of part sections have been taken.

The cutting machine 1 depicted in FIG. 1 is, according to the embodiment depicted, a mower 2 of the trailed type intended to be coupled to a motor vehicle (not depicted) which, during use, pulls it in the direction of forward travel 3. This mower 2 is similar to the mower described in document FR 2 759 533 filed by the applicant company and will therefore not be described in every detail. For further details reference may, as necessary, be made to the text of said document.

This mower 2 includes a harvesting mechanism 4 itself containing a cutting mechanism 5 which, during work, extends approximately horizontally and at right angles to the direction of forward travel 3. This cutting mechanism 5 includes a drive mechanism 7, a number of cutting devices 8; 8A according to the invention, and cutting members 9. From FIG. 1 it may be seen that the cutting members 9 and the cutting devices 8; 8A are arranged in a line 10 which extends approximately at right angles to the direction of forward travel 3. According to the embodiment depicted, each cutting member 9 and each cutting device 8; 8A is intended to be driven in rotation in a respective direction of rotation 12, 12' in such a way that each cutting member 9 converges with a neighboring cutting device 8; 8A as depicted in FIG. 1. For this purpose, the product cut by a cutting device 8; 8A and a cutting member 9 which converge is, during work, driven between said cutting device 8; 8A and said cutting member 9 toward the rear of the mower 2.

Figure 2:
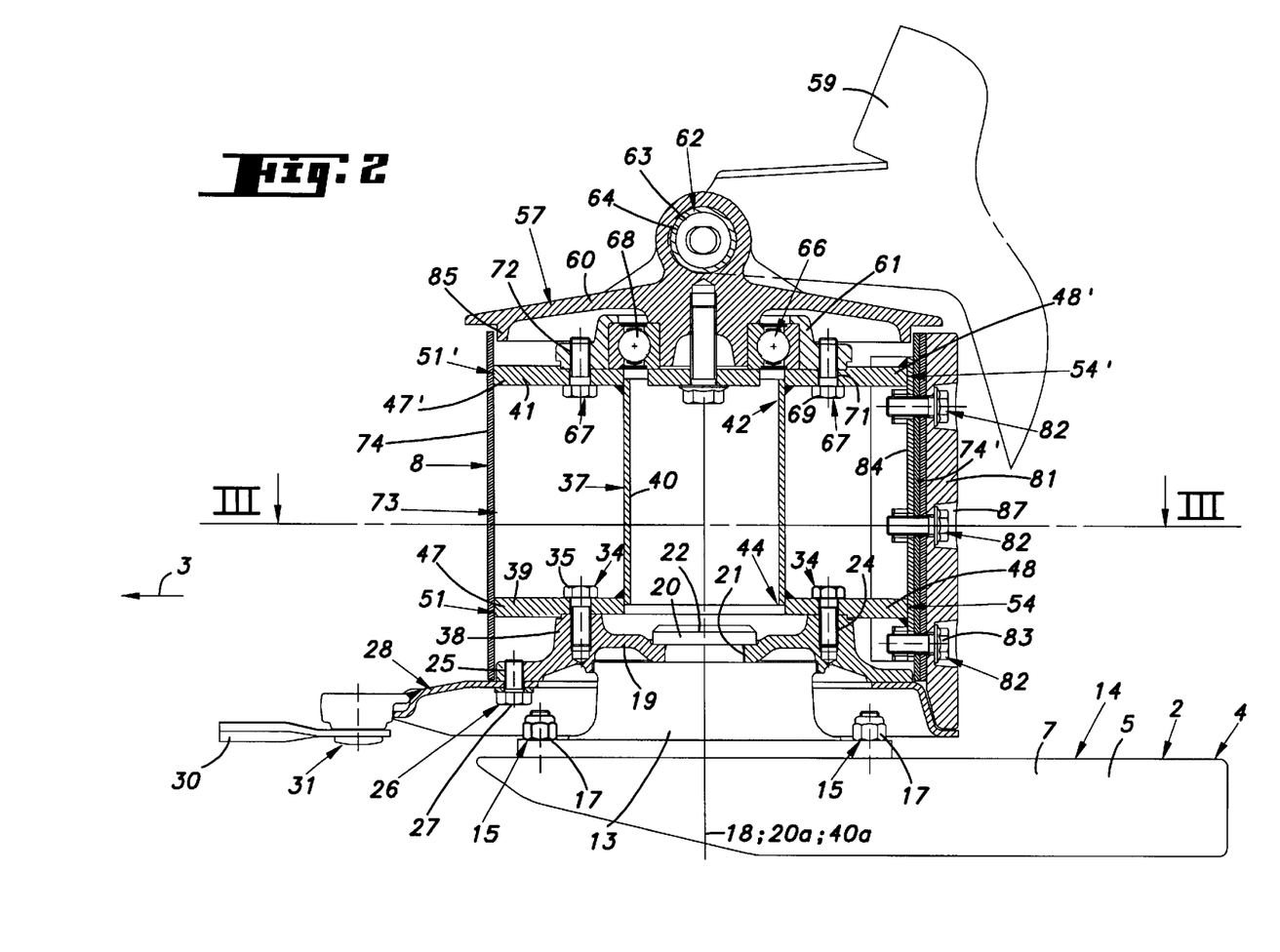
FIG. 2 depicts, to a different scale, a side view in section on the cutting plane I—I defined in FIG. 1 of a cutting device connected to the cutting machine of FIG. 1 according to a first embodiment.
Figure 3:
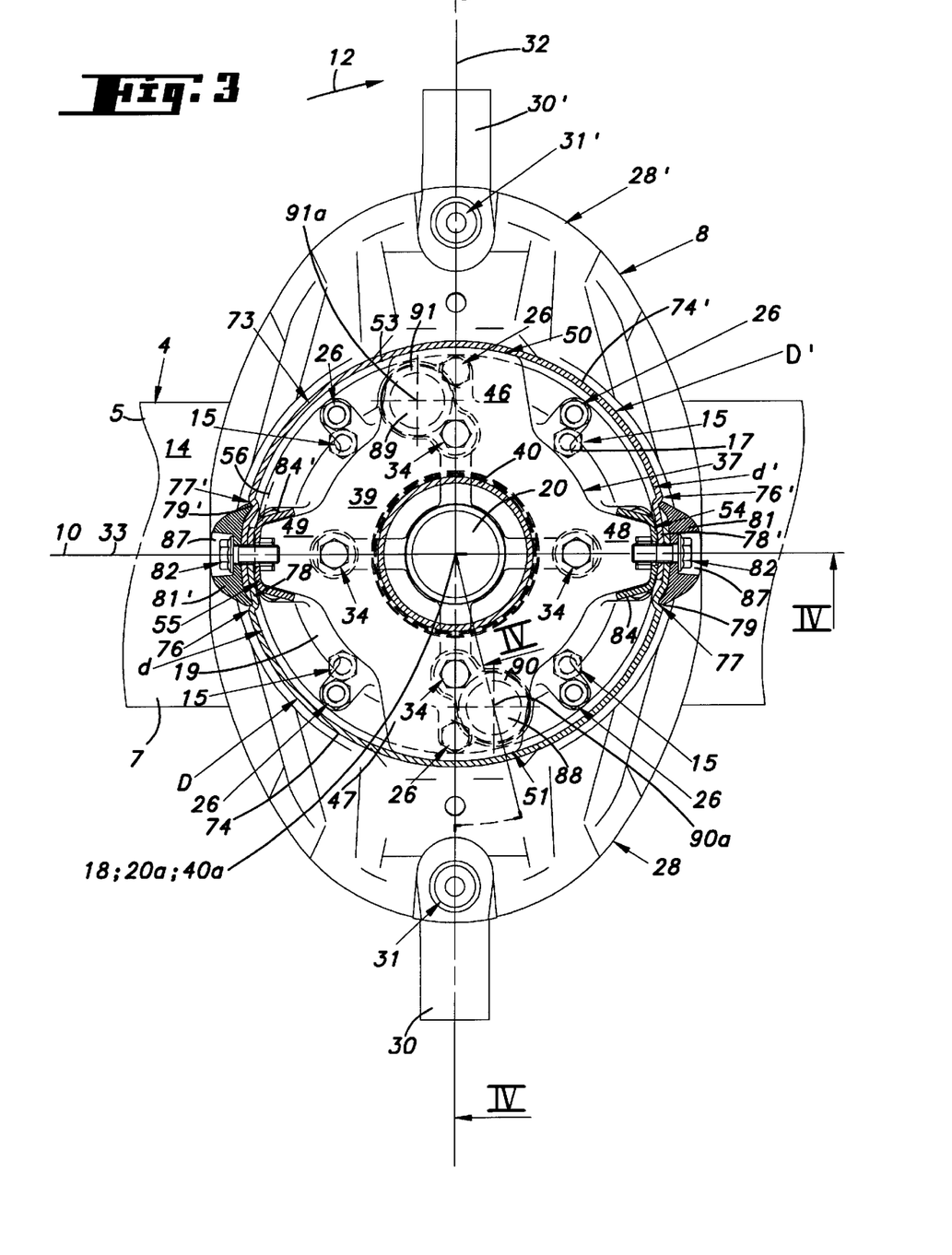
FIG. 3 depicts a top view in section of the cutting device on the cutting plane III—III defined in FIG. 2.

From FIGS. 2 and 3 it may be seen that each cutting device 8 includes a casing 13 by means of which it is fixed to the upper part 14 of the drive mechanism 7 using assembly elements 15. According to the embodiment depicted, these assembly elements 15 are made up of four bolts 17 extending approximately vertically and distributed approximately uniformly about the central axis 18 of the cutting device 8. The cutting device 8 according to the invention also includes a driver 19 which is intended to be driven in rotation by a drive shaft 20, the axis of rotation 20a of which is at least approximately coincident with the central axis 18. This drive shaft 20 is, during work, driven in rotation by means of the drive mechanism 7 about its axis of rotation 20a. Said drive mechanism, being widely known to those skilled in the art, will not be described further.

To this end, it will also be noted that this drive shaft is guided in rotation in the casing 13 by means of a connection of the pivot type which is not depicted.

In FIGS. 2 and 3, it may also be seen that the driver 19 is fixed to the drive shaft 20, on one hand by means of flutings 21 and on the other hand by means of a shoulder 22 provided on said drive shaft 20 and another shoulder generated by the connection of the pivot type which is not depicted. This driver 19 is of at least approximately circular shape and has a certain number of tappings 24, 25 distributed at least approximately uniformly about the central axis 18 of the cutting device 8.

It will be noted that there are ten tappings 25 and that each of them is intended to take an assembly element 26 which, according to the embodiment depicted, is a screw 27 which is screwed into said tapping 25. These screws 27 allow two cutting supports 28, 28' to be fixed removably to the driver 19. More specifically, it can be seen from FIGS. 2 and 3 that each cutting support 28, 28' is fixed under the driver 19 by means of five corresponding screws 27 and that each cutting support 28, 28' supports a cutting element 30, 30' that allows a product to be cut when the driver 19 is driven in rotation about the axis of rotation 20a of the drive shaft 20. These two cutting supports 28, 28' are substantially identical and located radially facing each other so that the cutting elements 30, 30' extend outward away from the axis of rotation 20a with respect to their connection 31, 31' which connects them to the corresponding cutting supports 28, 28'. It will further be noted that the two cutting supports 28, 28' are together, when viewed from above, of approximately oval or elliptical shape and are approximately symmetric, on the one hand, with respect to a longitudinal straight line of symmetry 32 passing through the two connections 31, 31' and the central axis 18 and, on the other hand, with respect to a transverse straight line of symmetry 33 approximately at right angles to said longitudinal straight line of symmetry 32 and also passing through the central axis 18.

The tappings 24 on the other hand are four in number and each is intended to take an assembly element 34 which, according to the embodiment depicted, is a screw 35 screwed in to said tapping 24. These screws 27 allow a support structure 37 to be fixed removably to the driver 19. More specifically, it can be seen from FIGS. 2 and 3 the at this support structure 37 is f fixed to the driver 19 using the screws 35. For this purpose the driver 19 has four bulges 38 against which the support structure 37 bears. This support structure 37, according to the embodiment depicted, has a bottom end plate 39, a tubular shaft 40 and a top end plate 41. The tubular shaft 40 has a longitudinal geometric axis 40a at least approximately coincident with the central axis 18 of the cutting device 8 and has an upper end 42 in the vicinity of which the top end plate 41 is located and a lower end 44 in the vicinity of which the bottom end plate 39 is located. Each end plate 39, 41 extends, in the embodiment depicted, approximately horizontally and is starshaped. Each end plate 39, 41 includes two broad bands 46, 47, 46', 47' and two narrow bands 48, 49, 48' 49'. The two broad bands 46, 47, 46', 47' each have an outer end 50, 51, 50', 51' which are rounded to follow a first circle 53 centered on the longitudinal geometric axis 40a. The two narrow bands 48, 49, 48', 49' for their part each have an outer end 54, 55, 54', 55' rounded to follow a second circle 56, also centered on the longitudinal geometric axis 40a.

From the various figures it may also be seen that the cutting device 8 has an upper support 57 which is connected, on the one hand, to a carrying structure 59 forming part of the harvesting mechanism 4 and, on the other hand, to the support structure 37. FIG. 2 more specifically shows that this upper support 57 has a first part 60 and a second part 61. This first part 60 is connected to the carrying structure 59 of the harvesting mechanism 4 by means of an elastic connection 62 which, according to the embodiment depicted, is made up of an elastic ring 63 itself including a flexible element made up of a rubber element 64. This elastic connection 62 advantageously prevents the transmission of any or some of the vibrations between the cutting device 8 and the carrying structure 59.

The second part 61 is itself connected, on the one hand, to the first part 60 by means of a connection 66 of the pivot type and, on the other hand, removably, to the top end plate 41 of said support structure 37 by means of assembly elements 67. According to the embodiment depicted, it can be seen that this connection 66, of the pivot type, includes a rolling be a ring 68 and that the assembly elements 67 are made up of screws 69 passing, on the one hand, through holes 71 made in the top end plate 41 and screwed, on the other hand, into tappings 72 made for this purpose in the second part 61.

From the various figures, it can also be seen that the cutting device 8 also includes a drive device 73 intended to drive cut product toward the rear of the cutting machine 1. This drive device 73 includes, according to the embodiment depicted, two drive walls 74, 74' which extend approximately vertically between the first part 60 of the upper support 57 and the cutting supports 28, 28'. It will also be noted that each drive wall 74, 74', when viewed from above, at least approximately forms a portion of a surface of revolution which, according to the embodiment depicted, is formed of a semicircle with an outside diameter D, D'.

To this end, it will be noted that the two drive walls 74, 74' are at least approximately identical and that they extend approximately right around the support structure 37 and that each of said drive walls 74, 74' includes two lateral ends 76, 76', 77, 77' extending upward.

To make sure that the cutting device 8 is well sealed and prevent cut product from getting inside the drive walls 74, 74', it will be noted that said two drive walls 74, 74' overlap at their lateral ends 76, 76', 77, 77'.

To this end, it may be seen from FIG. 3 that each drive wall 74, 74' has, at one of its lateral ends 76, 76', a narrow part 78, 78' extending at least approximately vertically upward and with a diameter d, d' which is somewhat smaller than the diameter D, D' described previously. At the other lateral end 77, 77' of each drive wall 74, 74' there is a groove 79, 79' extending at least approximately vertically upward. According to this embodiment depicted, it can be seen from FIG. 3 that the lateral end 77, 77' overlaps the corresponding narrow part 78, 78', extending above the latter.

The drive device 73 also includes two drive members 81, 81' which can play a part in transporting the cut product toward the rear of the cutting machine 1. Each drive member 81, 81' extends upward in the vicinity of the corresponding lateral ends 76, 76', 77, 77' of the drive walls 74, 74' and allows these walls to be fixed removably to the support structure 37 by means of corresponding assembly elements 82.

For this purpose, the drive members 81, 81' bear against the corresponding drive walls 74, 74' at their lateral ends 76, 76' 77, 77' and said drive walls 74, 74' bear against the branches 46, 46', 47, 47', 48, 48', 49, 49' of the end plates 39, 41 of the support structure 37. More specifically, the assembly elements 82 are made up of screws 83 passing, on the one hand, through the drive members 81, 81' and the ends 76, 76', 77, 77' of the drive walls 74, 74' and screwed, on the other hand, into a corresponding tapped support 84, 84' which forms part of the support structure 37.

According to the embodiment depicted, there are two tapped supports 84, 84', each extending approximately vertically from a corresponding narrow branch 48, 49, 48', 49' to the other 48, 49, 48', 49', to which branches said tapped supports 84, 84' are fixed.

From FIG. 3, it may also be seen that each drive member 81, 81' is in a half-moon shape and that one of its ends is housed in the corresponding groove 79, 79' of a drive wall 74, 74' and that the other end of said drive member 81, 81' lies in the region of the drop created by the change from diameter D, D' to diameter d, d' of said corresponding drive wall 74, 74'. An arrangement of this kind of the drive members 81, 81' with the drive walls 74, 74' advantageously makes it possible to avoid cut product becoming trapped between said drive members 81, 81' and said drive walls 74, 74' and also allows good sealing to be achieved between these.

From FIG. 2, it may also be seen that the drive walls 74, 74' extend relatively close to the first part 60 of the upper support 57 and that said first part 60 has a circular bulge 85 which extends downward and which is located inside said drive walls 74, 74' and very close thereto. An arrangement of this kind of the first part 60 of the upper support 57 and of the drive walls 74, 74' advantageously allows a kind of baffle to be created, so as to form obstacles in the path of any cut product which might attempt to enter the cutting device 8.

The drive walls 74, 74' also extend relatively close to the cutting supports 28, 28' and the driver 19, and this also allows a kind of baffle to be created, so as to form obstacles in the path of any cut product which might attempt to enter the cutting device 8.

From FIG. 2, it may also be seen that each screw 83 extends approximately at right angles to the central axis 18 of the cutting device 8 and that the head of each screw 83 is housed in a respective recess 87 made in the drive members 81, 81', which advantageously allows said head of the screw 83 to be kept out of the stream of cut product and thus prevent said head from becoming worn as this would make this screw more complicated to remove.

Figure 4:
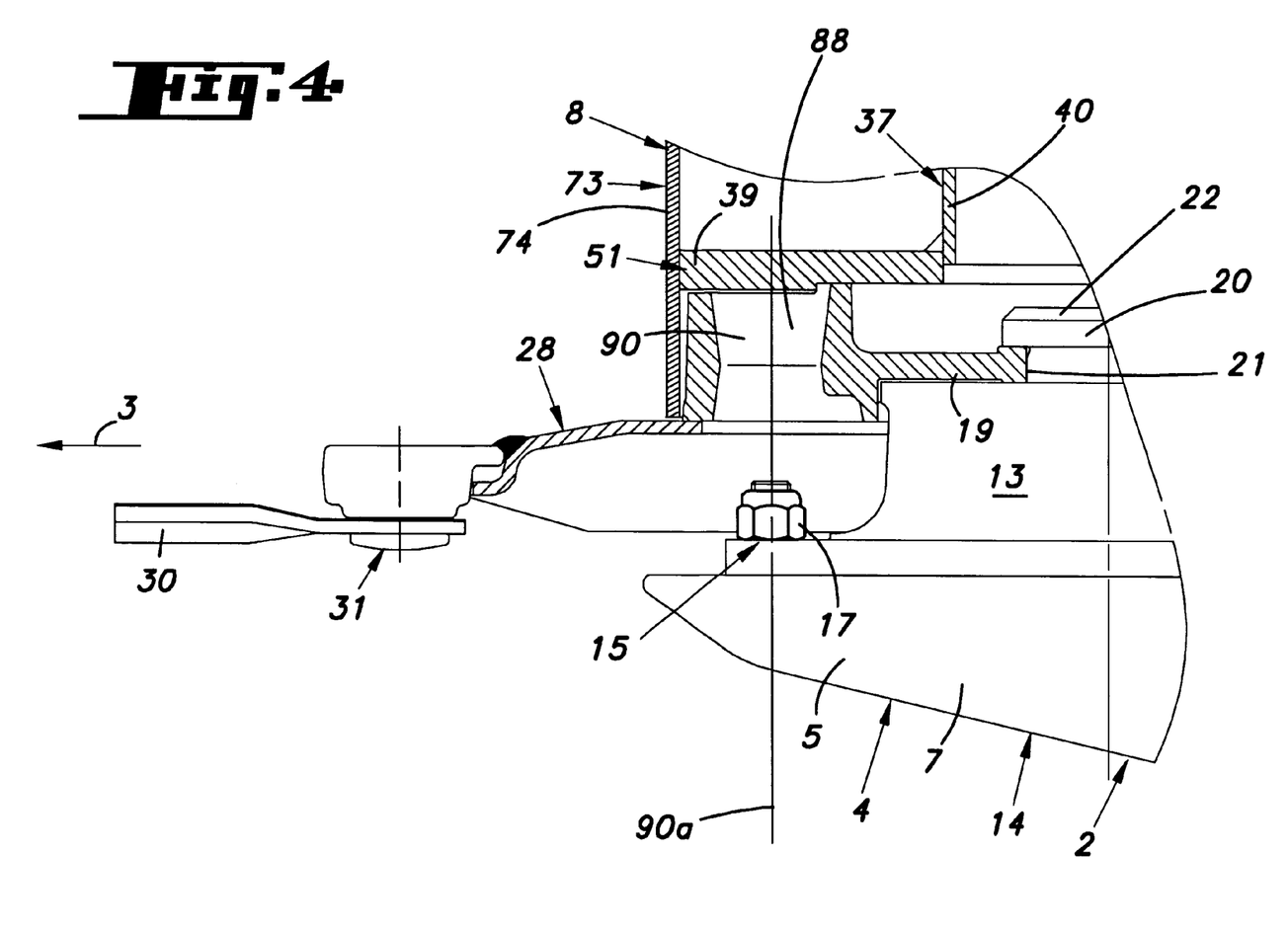
FIG. 4 depicts, to a different scale, a part view in section of the cutting device on the cutting plane IV—IV defined in FIG. 3.

From FIGS. 3 and 4, it may be seen that the driver 19 also includes two access orifices 88, 89 intended to allow access to the assembly elements 15, more specifically to the bolts 17. Such an access orifice 88, 89 is, according to the embodiment depicted, formed of a circular hole 90, 91 of longitudinal axis 90a, 91a directed upward and advantageously allows the bolts 17 to be accessed from above using removal tooling, this considerably facilitating fitting and removal operations. It will be noted that when the support structure 37 is fixed to the driver 19, as described previously, the bottom end plate 39 closes off the top of the two circular holes 90, 91 to prevent any cut product or the like from entering the cutting device 8.

It will be noted that the cutting device 8 overall is sealed against cut product so as to prevent the latter from entering inside the drive walls 74, 74'.

In order to remove this cutting device 8 according to this first embodiment, the operator proceeds as follows.

First of all, the operator removes the screws 83 and this allows him to set down the two drive members 81, 81' and the two drive walls 74, 74'. Thus, by removing the screws 83, the operator may rapidly set down the outer elements which are in contact with the cut product and which therefore carry the risk of experiencing significant wear or even of being damaged.

It will be noted that the operator also, at any moment, has the possibility of setting down, on the one hand, the cutting supports 28, 28', by removing the screws 27, and, on the other hand, the cutting elements 30, 30', by disconnecting the connection 31, 31', for example so that they can be replaced.

Having set down the drive walls 74, 74', the operator has access to the screws 35 and to the screws 69, and by removing these screws 35, 69, the operator can set down the support structure 37 by moving the drive mechanism downward slightly and/or by moving the upper support 57 upward slightly.

When the support structure 37 has been set down, the operator can then either set down the upper support 57 or set down the assembly made up of the casing 13, the drive shaft 20 and the driver 19.

To set down the upper support 57, the operator simply removes the elastic connection 62 which connects said upper support 57 to the carrying structure 59 of the harvesting mechanism 4. At this stage of disassembly, the operator also has the possibility of setting down the second part 61 of the upper support 57 to perform an intervention on the bearing 68.

In order to set down the assembly made up of the casing 13, the drive shaft 20 and the driver 19, the operator turns the driver 19 about the central axis 18 until one of the access orifices 88, 89 lies over a bolt 17, which allows the operator to remove this bolt from above. Having thus removed all of the bolts 17, the operator can withdraw the casing 13 from the drive mechanism 7.

To reassemble this cutting device 8, the operator carries out the procedure described hereinabove in reverse order.

Figure 5:
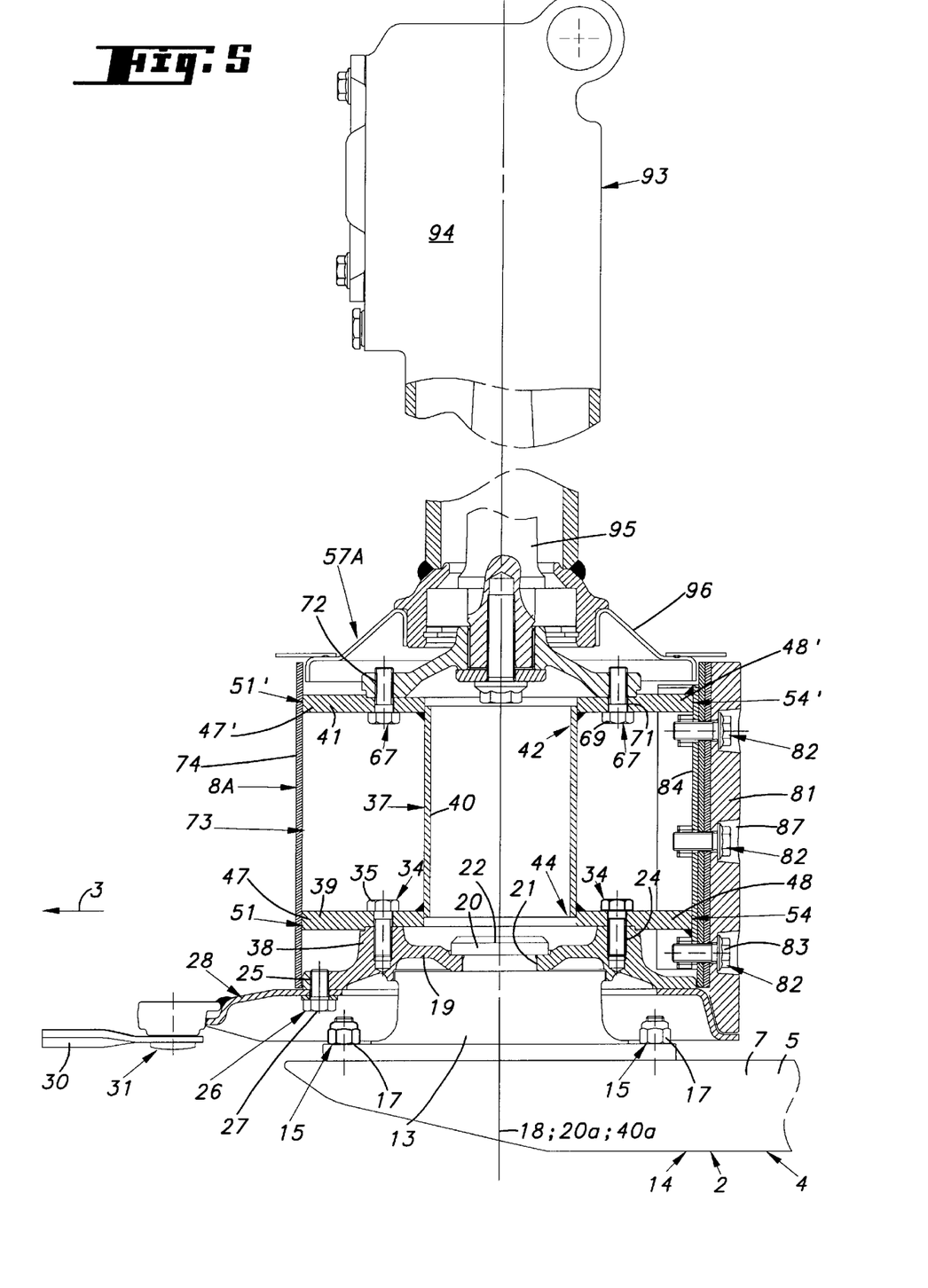
FIG. 5 depicts, to a different scale, a side view in section of a cutting device connected to the cutting machine of FIG. 1 according to a second embodiment.

FIG. 5 depicts a side view in section of a cutting device 8A according to a second embodiment. This cutting device 8A has a certain number of elements which were described previously. These elements will therefore keep the same reference numerals and will not be described again. It also includes a certain number of elements which are comparable with elements of the cutting device 8, followed by the letter A. These will be described only where such description proves necessary.

The second embodiment of the cutting device 8 is, overall, very similar to the cutting device 8 described previously. It should be noted that the main difference between this cutting device 8A as compared with the cutting device 8 described previously, lies in the fact that the support structure 37 is driven in rotation about the central axis 18 by means of a transmission device 93.

This transmission device 93 is intended to be driven itself by an external mechanical source and, according to this second embodiment depicted, includes a drive box 94 located approximately above the cutting device 8A. It will be noted that it is through this cutting device 8A that the drive mechanism 7 is intended to be set in motion. The motion thus enters the drive mechanism 7 through the drive shaft 20 of the cutting device 8A and leaves it via the various drive shafts (not depicted) of the cutting members 9 and through the drive shafts 20 of the cutting devices 8.

According to this second embodiment depicted, it will be noted that this transmission device 93 includes an additional drive shaft 95 which extends inside of the drive box 94 and which is fixed to the top end plate 41 of the support structure 37 by means of the screws 69.

It will also be noted that the upper support 57A includes, in this second embodiment depicted, more than one single part 96 fixed to the drive box 94 and which fulfills the same sealing functions as the first part 60 of the upper support 57 described previously.

On the whole, removal and reassembly according to this second embodiment depicted is similar to the removal and reassembly of the cutting device 8 according to the first embodiment.

Finally, various modifications may be made to the embodiments which have just been described, particularly as regards the construction of the various elements or by substituting technical equivalents, without in any way departing from the field of protection.

Thus, for example, it is perfectly possible to replace the two drive members 81, 81' with a special shape of drive walls which fulfill the same functions as said drive members 81, 81'. To do this, the screws 83 may bear directly against the specially shaped drive walls so as to fix these walls to the support structure 37.

What is claimed as new and desired to be secured by letters patent of the United States is:

1. A cutting device for a cutting machine comprising:
   a driver driven by a drive shaft,
   at least one cutting support supporting at least one cutting element,
   a support structure secured to the driver, and
   at least one drive device which drives a cut product toward a rear of the cutting device,
   wherein the at least one drive device includes at least two drive walls which extend approximately right around the support structure and which are fixed removably to said support structure by assembly elements.

2. Cutting device of a cutting machine as claimed in claim 1, wherein the support structure is fixed removably at one of the ends of said support structure to the driver by assembly elements.

3. Cutting device of a cutting machine as claimed in claim 1, wherein the drive walls bear against the support structure and each forms, when viewed from above, at least a portion of a surface of revolution.

4. Cutting device of a cutting machine as claimed in claim 1, wherein each drive wall includes two lateral ends extending upward and said drive walls overlap at their lateral ends.

5. Cutting device of a cutting machine as claimed in claim 1, wherein the drive walls are identical.

6. Cutting device of a cutting machine as claimed in claim 1, wherein the drive device additionally includes at least two drive members fixed to the support structure by assembly elements.

7. Cutting device of a cutting machine as claimed in claim 4, wherein the drive device additionally includes at least two drive members fixed to the support structure by assembly elements and wherein the number of drive members is identical to the number of drive walls, and each of said drive members extends upward in a region of a corresponding lateral end of the drive walls.

8. Cutting device of a cutting machine as claimed in claim 6, wherein the drive members bear against the corresponding drive walls and allow said drive walls to be fixed to the support structure by corresponding assembly elements.

9. Cutting device of a cutting machine as claimed in claim 8, wherein each drive wall includes a groove in which part of the corresponding drive member is housed.

10. Cutting device of a cutting machine as claimed in claim 1, further comprising a casing by which said cutting device is fixed to a drive mechanism by assembly elements.

11. Cutting device of a cutting machine as claimed in claim 10, wherein the driver has at least one access orifice which allows access to the assembly elements which fix the casing to the drive mechanism.

12. Cutting device of a cutting machine as claimed in claim 1, wherein the cutting support is fixed to the driver removably by assembly elements.

13. Cutting device of a cutting machine as claimed in claim 1, further comprising two cutting supports located radially facing each other.

14. Cutting device of a cutting machine as claimed in claim 1, wherein the assembly elements are made up of screws or bolts.

15. Cutting machine comprising:
- a drive mechanism and at least one cutting device, wherein said at least one cutting device includes a driver driven by a drive shaft,
- at least one cutting support supporting at least one cutting element,
- a support structure secured to the driver, and
- at least one drive device which drives a cut product toward a rear of the cutting machine,
- wherein the at least one drive device includes at least two drive walls which extend approximately right around the support structure and which are fixed removably to said support structure by assembly elements.

16. Cutting machine as claimed in claim 15, wherein said cutting device includes an upper support connected to a member of the cutting machine and to which the support structure is connected removably by assembly elements.

17. Cutting machine as claimed in claim 16, wherein the upper support includes a first part connected to said member of the cutting machine and a second part connected to said first part by a connection of the pivot type, said support structure being connected removably to said second part of said upper support by said assembly elements.

18. Cutting machine as claimed in claim 17, wherein the first part of the upper support is connected directly to said member of the cutting machine by an elastic connection.

19. Cutting machine as claimed in claim 17, wherein the first part of the upper support is connected indirectly to said member of the cutting machine by an elastic connection.

20. Cutting machine as claimed in claim 16, wherein the drive walls extend vertically between the upper support and at least one cutting support.

* * * * *